(12) United States Patent
Davis (10) Patent No.: US 10,323,432 B2
(45) Date of Patent: Jun. 18, 2019

(54) BUILDING SYSTEM TO ENABLE PLACEMENT AND REMOVAL OF HOUSING UNITS WITHIN A SUPPORT STRUCTURE

(71) Applicant: CONTIGO HOMES LLC, Denver, CO (US)

(72) Inventor: Kyle Davis, Denver, CO (US)

(73) Assignee: Contigo Homes LLC, Denver, CO (US)

( * ) Notice: Subject to any disclaimer, the term of this patent is extended or adjusted under 35 U.S.C. 154(b) by 0 days.

(21) Appl. No.: 15/640,929

(22) Filed: Jul. 3, 2017

(65) Prior Publication Data

US 2018/0283036 A1    Oct. 4, 2018

Related U.S. Application Data

(60) Provisional application No. 62/481,170, filed on Apr. 4, 2017.

(51) Int. Cl.

| | | |
|---|---|---|
| *E04H 14/00* | (2006.01) | |
| *E04B 1/19* | (2006.01) | |
| *E04B 1/348* | (2006.01) | |
| *B65G 1/04* | (2006.01) | |
| *B65B 1/02* | (2006.01) | |
| *B65G 1/02* | (2006.01) | |

(52) U.S. Cl.
CPC ............. *E04H 14/00* (2013.01); *B65G 1/026* (2013.01); *B65G 1/0464* (2013.01); *E04B 1/19* (2013.01); *E04B 1/34807* (2013.01)

(58) Field of Classification Search
CPC ........... E04H 1/04; E04H 1/005; E04H 1/125; E04H 14/00; B65G 1/026; B65G 1/0464; E04B 1/34807; E04B 1/19

USPC ............................ 52/27, 30, 73, 79.1, 79.12
See application file for complete search history.

(56) References Cited

U.S. PATENT DOCUMENTS

| | | | | |
|---|---|---|---|---|
| 2,499,498 A | * | 3/1950 | Hammond, Jr. | .... E04B 1/34807 52/67 |
| 3,000,061 A | * | 9/1961 | Cooper | ................ A47B 47/022 52/236.9 |
| 3,638,380 A | * | 2/1972 | Perri | ........................ E04B 1/24 52/653.1 |
| 3,679,177 A | * | 7/1972 | Scholz | .................... E04G 21/16 254/89 R |
| 3,744,193 A | * | 7/1973 | Lau | ..................... E04B 1/34807 414/277 |

(Continued)

*Primary Examiner* — Theodore V Adamos
(74) *Attorney, Agent, or Firm* — Trenner Law Firm, LLC; Mark D. Trenner (57) ABSTRACT

A building system is disclosed as it may enable placement and removal of housing units within a support structure. An example building system includes a support frame, and a plurality of bays within the support frame. The example building system also includes a service core for providing utilities to each of the plurality of bays of the support frame. The example building system also includes an integral hoist on the support frame. The example building system also includes a tray system to support a plurality of housing units in the plurality of bays of the support frame. In an example, the tray system includes a plurality of trays in a stacked arrangement. each tray slides out of a respective bay to provide access for the housing unit by the integral hoist. Each tray slides in to the respective bay to position a respective housing unit within the support frame.

15 Claims, 7 Drawing Sheets

(56) References Cited

U.S. PATENT DOCUMENTS

| | | | | |
|---|---|---|---|---|
| 3,800,963 | A | * | 4/1974 | Holland ............... B65G 1/0414 191/12.2 R |
| 3,823,520 | A | * | 7/1974 | Ohta ....................... E04B 1/24 52/73 |
| 4,227,466 | A | * | 10/1980 | Rooklyn ............... A47F 5/0093 108/102 |
| 4,854,094 | A | | 8/1989 | Clark |
| 5,180,069 | A | * | 1/1993 | Krummell .............. B65G 1/026 211/151 |
| 5,544,999 | A | | 8/1996 | Ducharme et al. |
| 5,706,614 | A | | 1/1998 | Wiley, Jr. et al. |
| 6,470,630 | B1 | * | 10/2002 | Miyamoto .......... E04B 1/34807 52/64 |
| 6,851,562 | B2 | * | 2/2005 | Gorniak ................. B65G 1/026 211/151 |
| 7,121,603 | B2 | * | 10/2006 | Stevenson ............... B60P 1/003 296/26.09 |
| 9,556,632 | B2 | | 1/2017 | Malakauskas et al. |
| 9,663,937 | B2 | * | 5/2017 | Goldman .............. E04B 1/3483 |
| 2006/0101727 | A1 | * | 5/2006 | Holgerson .......... A62C 99/0081 52/79.1 |
| 2009/0019811 | A1 | * | 1/2009 | Goldman ............ E04B 1/34807 52/653.2 |
| 2015/0152634 | A1 | | 6/2015 | Unger |
| 2016/0312485 | A1 | * | 10/2016 | Wilson .................... E04H 1/005 |
| 2016/0376784 | A1 | * | 12/2016 | Timur ..................... E04B 1/343 52/29 |
| 2017/0342704 | A1 | * | 11/2017 | Austin ................ E04B 1/34869 |
| 2018/0035625 | A1 | * | 2/2018 | Lindbo .................. A01G 31/06 |

\* cited by examiner

BUILDING SYSTEM TO ENABLE PLACEMENT AND REMOVAL OF HOUSING UNITS WITHIN A SUPPORT STRUCTURE

PRIORITY CLAIM

This application claims the priority benefit of U.S. Provisional Patent Application No. 62/481,170 filed Apr. 4, 2017 of Kyle Davis titled "Building System To Enable Placement And Removal Of Housing Units Within A Support Structure," hereby incorporated by reference in its entirety as though fully set forth herein.

BACKGROUND

Homes are typically stationary structures that cannot be moved. A homeowner would need to sell the home and purchase a different home in their desired location. Even traditional mobile homes are not readily moved. In addition, mobile homes may not be allowed in certain locations because of codes or cost of land (e.g., especially in urban locations).

DETAILED DESCRIPTION

A building system is disclosed which may be implemented to enable placement and removal of housing units within a support structure. An example building system includes a support frame, and a plurality of bays within the support frame. The example building system also includes a service core for providing utilities to each of the plurality of bays of the support frame. The example building system also includes an integral hoist on the support frame. The example building system also includes a tray system to support a plurality of housing units in the plurality of bays of the support frame. In an example, the tray system includes a plurality of trays in a stacked arrangement. Each tray slides out of a respective bay to provide access for the housing unit by the integral hoist. Each tray slides in to the respective bay to position a respective housing unit within the support frame.

The building system may enable placement and removal of housing units (e.g., premanufactured units) within a support structure so that the housing units can be relatively easily placed and removed from a support structure. This permits homeowners to live within a vertical structure in a desired location, and then readily move their home to another location when desired. By moving their home, the homeowner does not need to sell their existing home and buy a new home in a different location. The home can be taken with the homeowner.

Before continuing, it is noted that as used herein, the terms "includes" and "including" mean, but is not limited to, "includes" or "including" and "includes at least" or "including at least." The term "based on" means "based on" and "based at least in part on."

Figure 1:
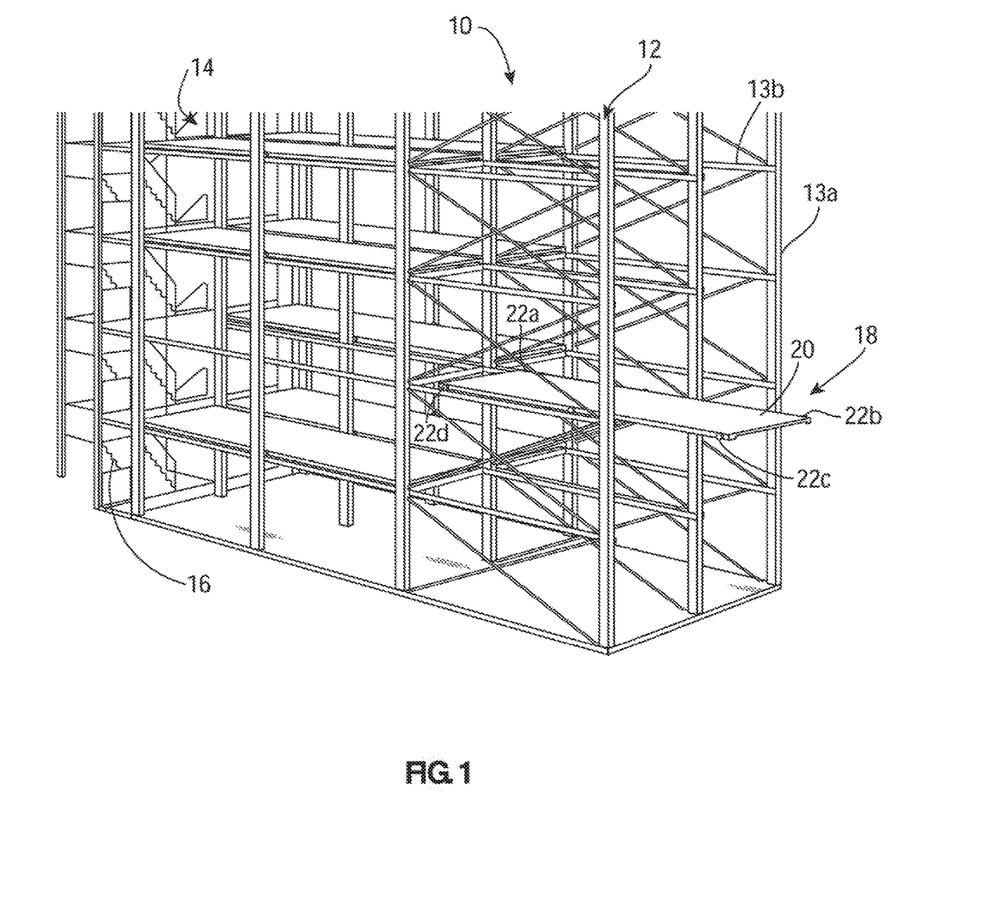
FIG. 1 shows an example building system to enable placement and removal of housing units within a support structure.
Figure 2:
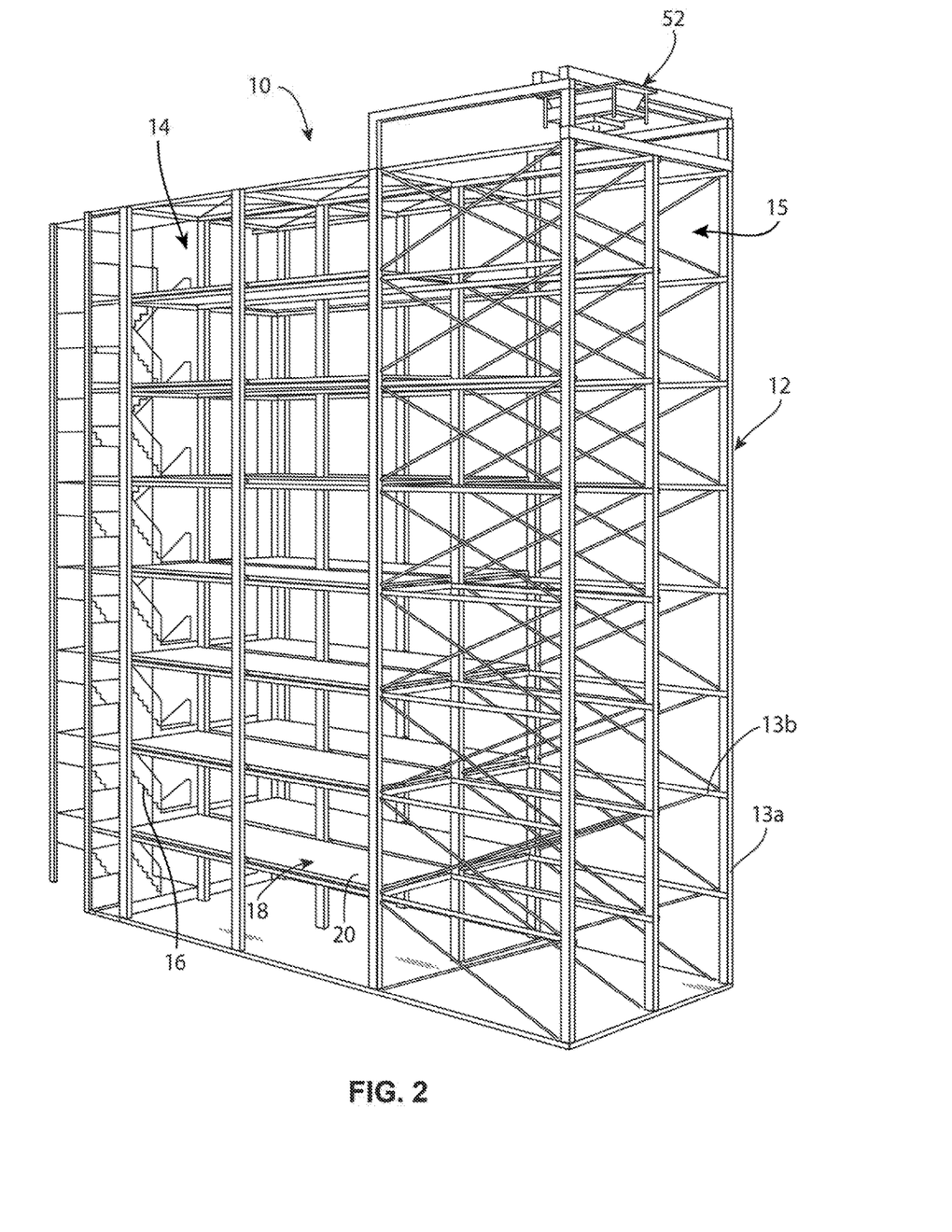
FIG. 2 shows an example of the building system without any housing units installed.

FIG. 1 shows an example building system 10 to enable placement and removal of housing units within a support structure. FIG. 2 shows an example of the building system without any housing units installed.

The example building system 10 utilizes a unique building system of components which allows the placement and removal of premanufactured housing units 50 within the structure. By incorporating a support frame 12, and a movable tray system 18 into the structure, these components create a unique building system 10 which allows each individual housing unit 50 to be independently provided within the structure for as long as desired.

An example building system 10 includes a support frame 12. The support frame 12 may include a plurality of vertical supports 13a and horizontal supports 13b. Other examples are also contemplated, as will be readily apparent to those having ordinary skill in the art after becoming familiar with the teachings herein.

In an example, the support frame 12 includes structural steel systems with reinforced concrete elements, reinforced concrete masonry elements, or any combination of these or any other building systems, as based on the local site conditions and economical construction methods. The width of the support frame 12 can be sized to accommodate any number of housing units 50 (e.g., a single unit wide to multiple-units wide), e.g., based upon property size. The support frame 12 can also be made to be as tall as desired, based on, e.g., local zoning codes and structural limitations.

The support frame 12 may have a service core 14 (e.g., for providing utilities such as gas, water, electric). The support frame 12 may also include a stairwell 16 and/or elevator and/or other walkways (not shown). Parking (not shown) may also be provided.

The support frame 12 defines a plurality of bays 15 within the support frame 12, e.g., between the vertical supports 13a and the horizontal supports 13b. In the example illustrated in the drawings, each bay 15 may house an individual housing unit 50.

The example building system 10 also includes a tray system 18 to support a plurality of housing units in the plurality of bays of the support frame. In an example, the tray system 18 includes a plurality of trays 20. Each bay 15 may have its own tray 20. Each tray 20 slides out of a respective bay 15 to provide access for the housing unit 50. Each tray 20 slides into the respective bay 15 to position a respective housing unit 50 within the support frame 12.

Figure 3:
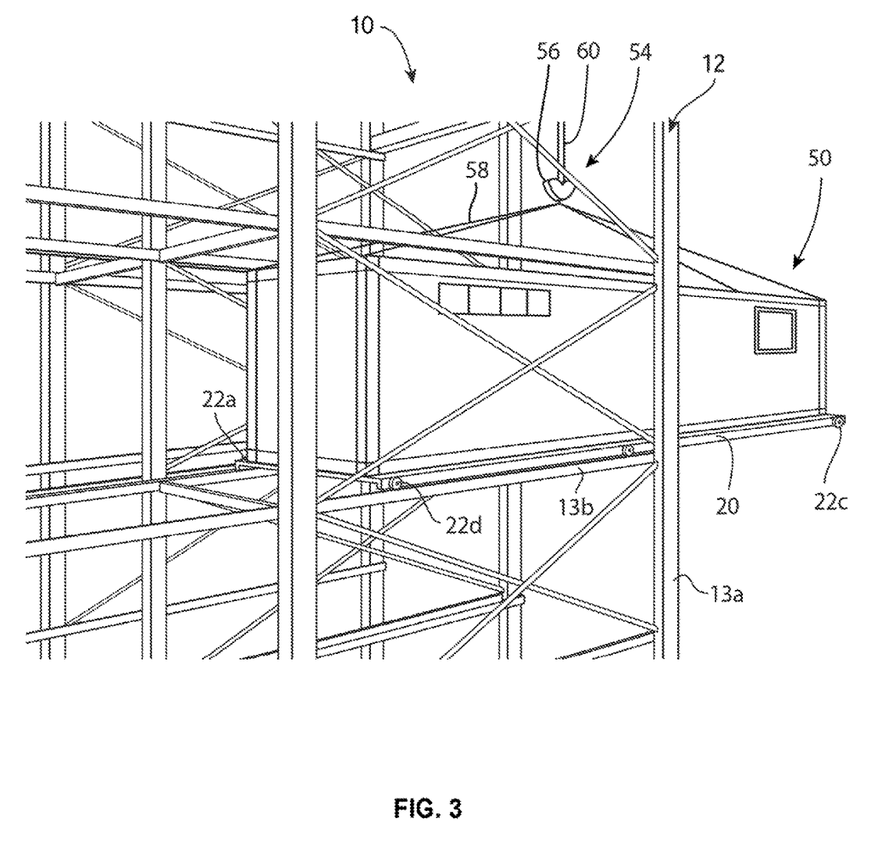
FIG. 3 shows an example of the building system with a housing units being installed.
Figure 4:
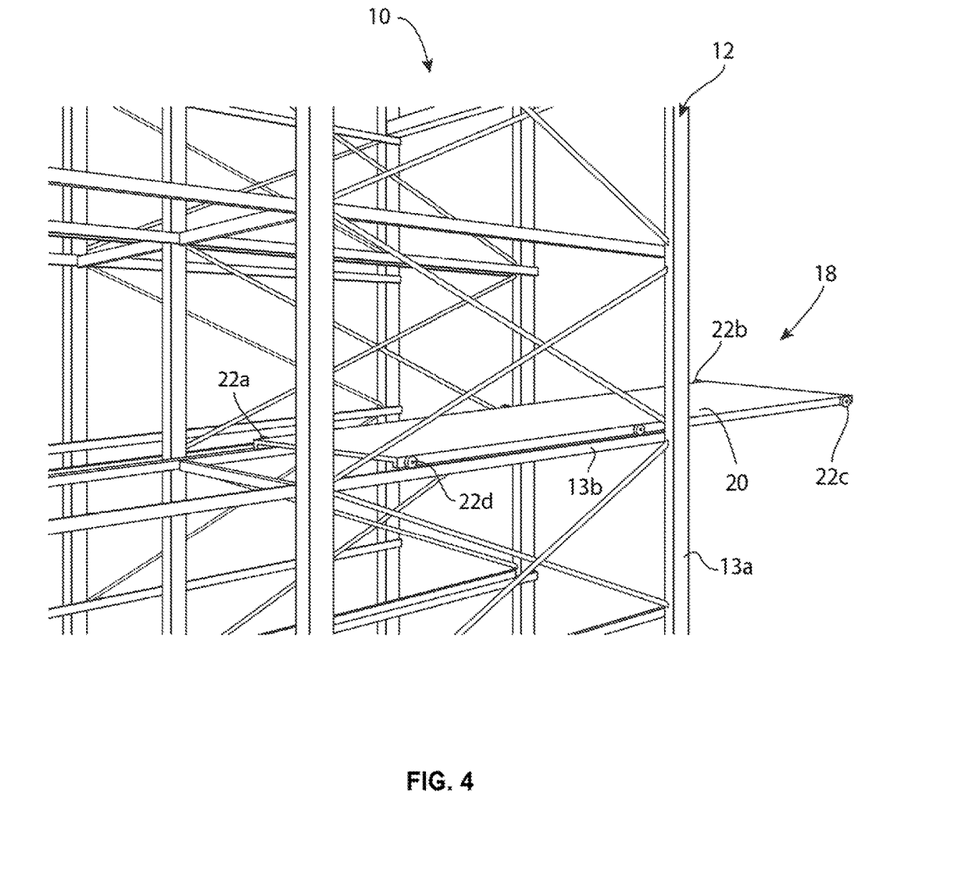
FIG. 4 shows an example of the building system with the tray in a loading position.

FIG. 3 shows an example of the building system with a housing unit 50 being installed. FIG. 4 shows an example of the building system 10 with one of the trays 20 in a loading position, e.g., to receive a housing unit 50.

In an example, the housing units 50 may be dwellings for people to live in. However, the housing units 50 are not limited to dwellings, and may include office space, hotel rooms, eateries, and/or other businesses. The housing units 50 may be portable. That is, the housing units 50 may be removed from the support frame 12 and relocated to other areas (e.g., other support frames and/or as stand-alone units). In an example, the housing units 50 are a standard size so that the housing units 50 are interchangeable within the support frame 12 and/or other support frames 12. Of course, different size housing units 50 may also be provided. For example, penthouse level housing units may be larger than other of the housing units. Or for example, housing units provided as dwellings may be one size, while housing units for businesses may be of another size.

Before continuing, it is noted that the examples described herein are provided for purposes of illustration, and are not intended to be limiting. Other devices and/or device configurations may be utilized to carry out the operations described herein.

Figure 5:
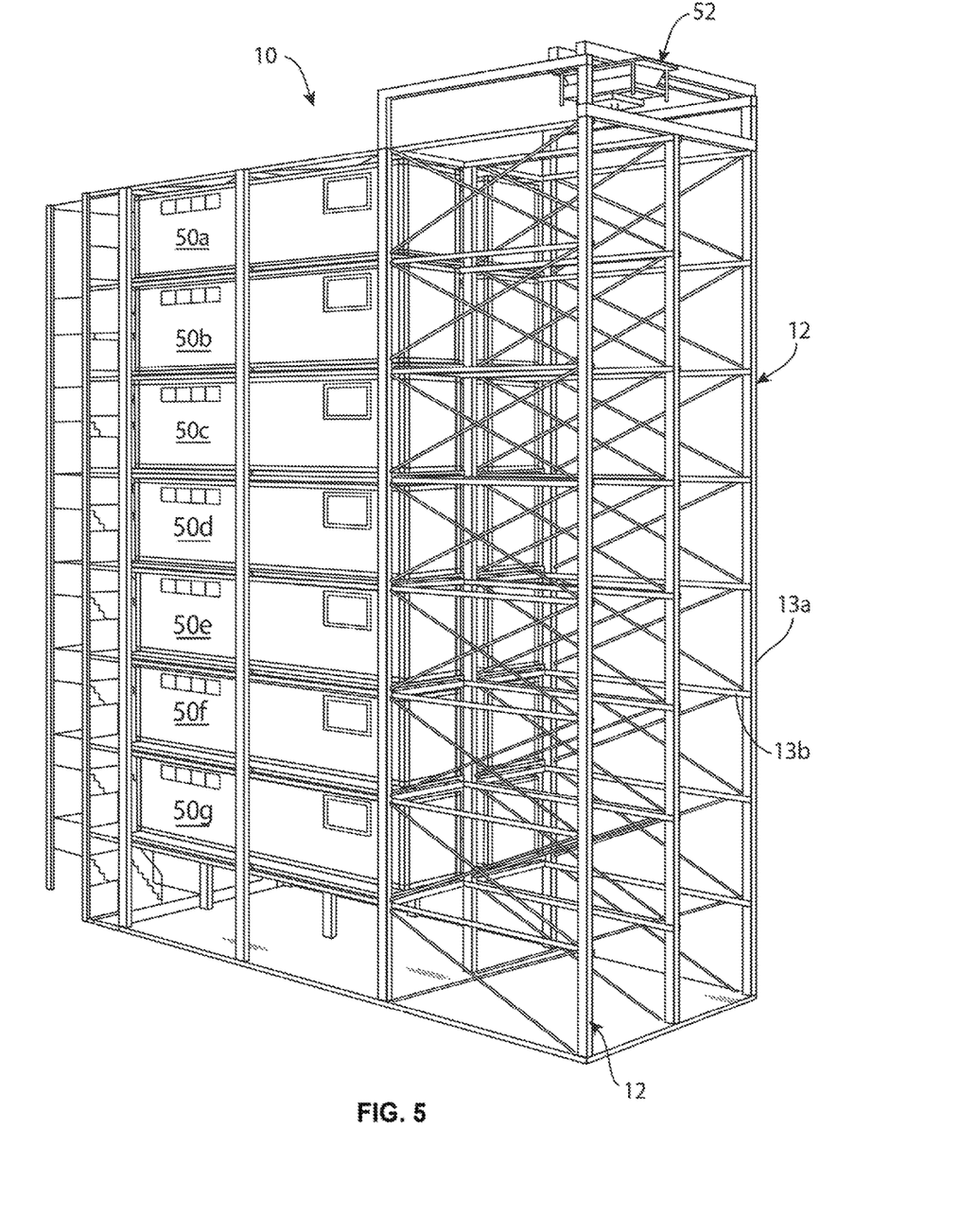
FIG. 5 shows an example of the building system with several housing units installed.

FIG. 5 shows an example of the building system with several housing units 50a-g installed in a "stacked" arrangement. The housing units 50 may be provided side-by-side one another, and on top of one another so that they appear to be "stacked" in the support frame 12. While the housing units 50 may appear to be "stacked" one on top of the other, the housing units 50 are actually separately supported within each bay 15 and do not set on top of one another or rely on one another for support. This configuration enables housing units 50 to be provided higher up within the support frame 12 without the need for housing units 50 to be provided at the lower levels. In another example, each bay 15 may house multiple housing units.

Figure 6:
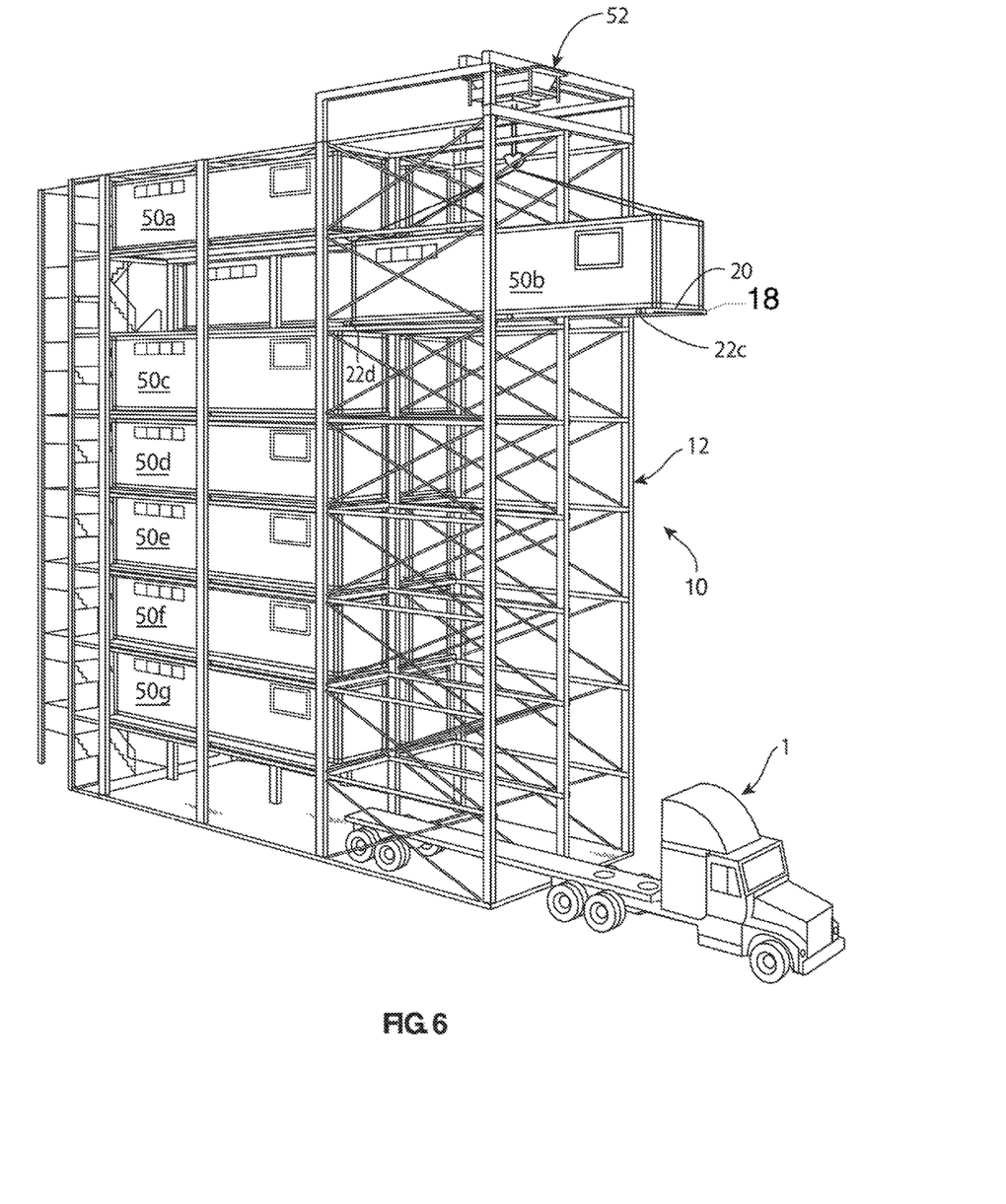
FIG. 6 shows an example of the building system with a housing unit being loaded or unloaded from a tractor trailer.

FIG. 6 shows an example of the building system with a housing unit being loaded or unloaded from a tractor trailer. In an example, the building system 10 also includes a tray system 18 to support a plurality of housing units. The tray system 18 includes a plurality of trays 20 in a stacked arrangement. The trays 20 slide out to provide access to the housing unit by a hoist system, and the trays 20 slide in to locate the housing units within the support frame. The tray 20 can be moved within the support frame using wheels or rollers 22a-d that are attached to the tray 20 which roll along a track attached to the support frame 12.

Figure 7:
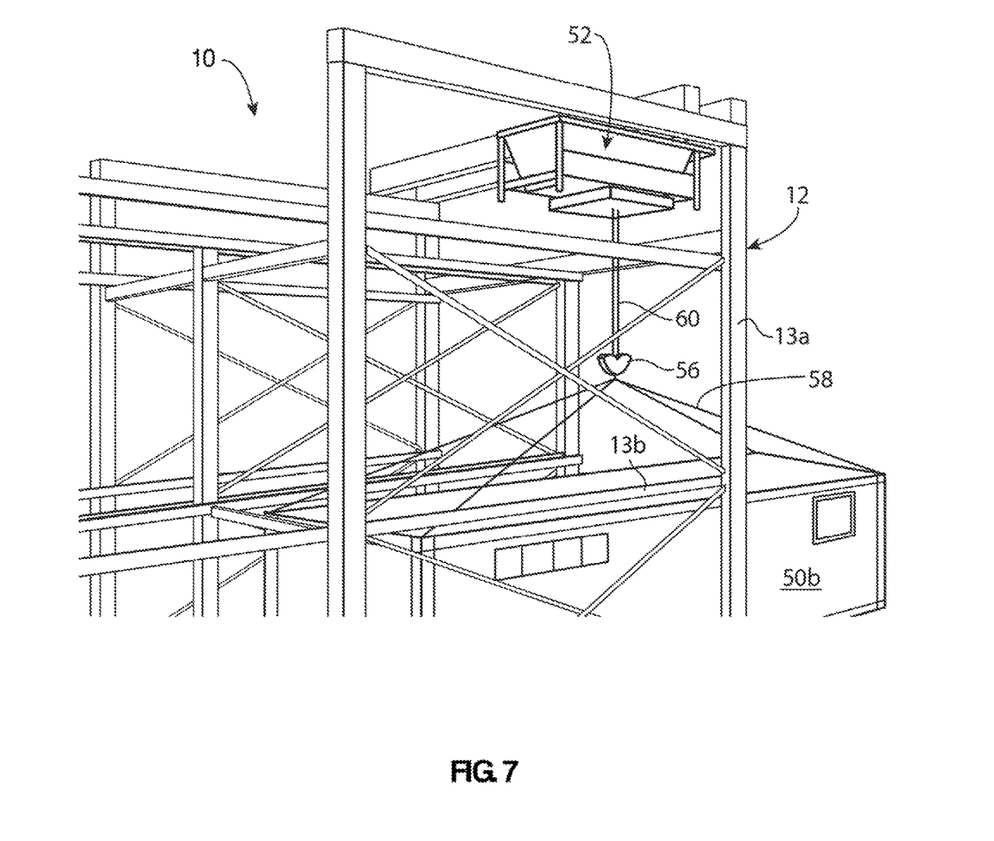
FIG. 7 shows an example support frame with integral hoist system which may be implemented for the example building system.

FIG. 7 shows an example support frame with integral hoist system which may be implemented for the example building system. In an example, the building system 10 also includes an integral hoist 52.

In an example, the hoist 52 includes an integral trolley crane or other type of lift. The hoist 52 may be located on a movable track connected to the top of the support frame 12, e.g., as shown in FIGS. 2 and 5-7. The hoist 52 may include a lift rigging 54. The lift rigging 54 may include attachment 56 and support cables 58 via lift cable 60 from the hoist 52. The lift rigging 54 can be attached to the housing unit 50 (e.g., at predetermined locations) to lift the housing unit 50 off of a delivery vehicle 1, and raise the housing unit 50 to the desired height. The hoist 52 may lower the housing unit 50 onto a tray 20, where the housing unit 50 may be attached to the tray 20, and disconnected from the hoist 52.

As used herein, the term "loading" position is when the tray 20 is fully extended away from the support frame 12 to enable the hoist 52 to lower the housing unit onto the tray 20. The term "set" position is when the tray 20 is completely retracted (e.g., towards the core of the support frame 12) and locked into a firm position.

In an example, the tray system 18 utilizes a flat surface or frame system (herein referred to as the "tray") that is large enough and structurally strong enough for the housing unit 50 to be placed upon. The tray 20 can be moved within the support frame 12, e.g., using wheels or rollers for the tray 20. The tray can be moved into its desired position using any combination of winches, cables, pulleys, power systems, and their associated hardware. For example, the tray 20 may roll along a track attached to the support frame 12.

In an example, wheel stop(s) may prevent the tray 20 from overextending in the "loading" position. The wheel stop(s) may also lock the wheels or rollers in place in the "set" position so that the housing unit 50 does not come out of the bay 15 in which it has been positioned.

In an example, a housing unit 50 may be placed or positioned within the support frame 12 as follows. A housing unit 50 arrives (e.g., by truck 1) and is parked in the loading area. A hoist 52 lowers a cable 60 and connects to the housing unit 50, e.g., at predetermined attachment points on the housing unit 50.

The hoist 52 lifts the housing unit 50 off of the truck 1 and to the desired height, which may be above the tray 20 where the housing unit 50 is to be installed.

The tray 20 moves out along the support frame track on the horizontal supports 13a-b and beneath the housing unit 50 so that the tray 20 is in a "loading" position.

The hoist 52 lowers the housing unit 50 onto the tray 20 where the housing unit 50 is then secured to the tray 20.

The tray 20 is retracted back into the support frame 12 to the "set" position, and the tray 20 is secured in place.

In an example, utility connections are made using a common coupling system for the housing units. The term "common" refers to a single unit for multiple utilities, and does not imply that the connection is common in the art. For example, a common coupling system may enable some or all of the utilities (e.g., water, electric, sewer). The term "common" may also refer to the ability to connect to any housing unit without adapters, for example, as a universal connection as between various types of housing units 50.

To remove the unit, the procedure is performed in reverse.

The operations shown and described herein are provided to illustrate example implementations. It is noted that the operations are not limited to the ordering shown. Still other operations may also be implemented.

It is noted that the examples shown and described are provided for purposes of illustration and are not intended to be limiting. Still other examples are also contemplated.

The invention claimed is:

1. A building system, comprising:
   a skeletal support frame having a plurality of vertical supports and a plurality of horizontal supports;
   a plurality of bays defined by the plurality of vertical supports and the plurality of horizontal supports within the support frame, each of the plurality of bays sized to house an individual housing unit;
   a loading portion of the support frame directly adjacent the plurality of bays, the loading portion including a plurality of vertical supports and a plurality of horizontal supports secured by cross members, the loading portion having a width which is wider than a width of the individual housing unit, and the loading portion having a length which is less than a length of the individual housing unit;
   a service core for providing utilities to each of the plurality of bays of the support frame;
   an integral hoist on the support frame; and
   a tray system including a tray to support the individual housing unit in one of the plurality of bays of the support frame, wherein the tray slides out of the bay to provide access to position the individual housing unit on the tray by the integral hoist, and the tray sliding in to the bay to position the individual housing unit on the tray within the support frame;
   wherein the tray is rolled along the track from a loading position into a set position and locked by the wheel stops to retain the tray within the support frame; and a common coupling system for utility connections of a plurality of housing units in the skeletal support frame, wherein the common coupling system is configured to connect a single one of the plurality of housing units to multiple utilities, and wherein the common coupling system is configured to connect to any one of the plurality of housing units without adapters as a universal connection between various types of the plurality of housing units.

2. The building system of claim 1, wherein the service core is on the support frame.

3. The building system of claim 2, wherein the service core has utility and service lines for connecting with each of the plurality of housing units.

4. The building system of claim 1, wherein the service core is further configured to provide user access to each of the plurality of bays of the support frame.

5. The building system of claim 4, wherein the service core includes at least one staircase.

6. The building system of claim 4, wherein the service core includes at least one elevator.

7. The building system of claim 1, wherein the support frame has at least one walkway along a side of each of the plurality of housing units.

8. The building system of claim 1, wherein each tray connects to and supports a respective housing unit.

9. The building system of claim 1, wherein each tray is moved within the support frame via powered rollers along the track attached to the support frame.

10. The building system of claim 1, wherein in the loading position at least one of the plurality of trays is fully extended away from the bay to enable the integral hoist to lower one of the housing units onto one of the trays.

11. The building system of claim 1 wherein in the set position the tray is retracted within the bay and locked into a firm position.

12. The building system of claim 1, wherein at least two of the plurality of housing units are substantially a same size so that the at least two housing units are interchangeable with each other within different bays of the same support structure.

13. The building system of claim 1, wherein at least two of the plurality of housing units are substantially a same size so that the at least two housing units are interchangeable with each other within different bays of a different support structure.

14. A method of installing a housing unit in a building system, the method comprising:
providing a skeletal support frame having a plurality of vertical supports and a plurality of horizontal supports defining a plurality of bays, the skeletal support frame having a loading portion directly adjacent to the plurality of bays, the loading portion including a plurality of vertical supports and a plurality of horizontal supports secured by cross members, the loading portion having a width which is wider than a width of the individual housing unit, and the loading portion having a length which is less than a length of the individual housing unit;
providing a track attached to the support frame;
providing a plurality of trays;
providing utilities to each of the plurality of bays of the support frame via a common coupling system configured to connect a single housing unit to multiple utilities, the common coupling system further configured to connect to any housing unit without adapters as a universal connection between various types of the plurality of housing units;
providing a dedicated and integral hoist on the support frame; and
supporting a plurality of housing units in the plurality of bays of the support frame in a stacked arrangement.

15. The method of claim 14, wherein each tray slides out of a respective bay to provide access for the housing unit by the integral hoist, and each tray slides in to the respective bay to position a respective housing unit within the support frame.

* * * * *